United States Patent [19]

Stirniman

[11] 4,275,438
[45] Jun. 23, 1981

[54] INDUCTION HEATING INVERTER

[75] Inventor: Robert P. Stirniman, Roselle, Ill.

[73] Assignee: Induction Heating International, Inc., Chicago, Ill.

[21] Appl. No.: 950,834

[22] Filed: Oct. 12, 1978

[51] Int. Cl.³ .......................................... H02M 7/515
[52] U.S. Cl. ........................................ 363/136; 363/96
[58] Field of Search .................................. 363/27–28, 363/96, 135–136; 219/10.55 B, 10.77

[56] References Cited

U.S. PATENT DOCUMENTS

| | | | |
|---|---|---|---|
| 3,290,581 | 12/1966 | Hooper | 363/135 X |
| 3,349,315 | 10/1967 | Studtmann | 363/135 |
| 3,422,342 | 1/1969 | Jackson | 363/136 |
| 3,424,973 | 1/1969 | Smyth | 363/135 |
| 3,454,863 | 7/1969 | Hintz et al. | 363/135 |
| 4,028,610 | 6/1977 | Cord'homme | 363/96 X |
| 4,047,092 | 9/1977 | Bendzsak | 363/135 |

FOREIGN PATENT DOCUMENTS 312349 10/1971 U.S.S.R. .................................. 363/136

*Primary Examiner*—William M. Shoop
*Assistant Examiner*—Peter S. Wong
*Attorney, Agent, or Firm*—Leydig, Voit, Osann, Mayer & Holt, Ltd.

[57] ABSTRACT

A static power supply for converting DC power from a source to AC power at relatively high frequencies in a load. The static power supply is particularly useful for supplying power to induction heating loads operating at frequencies of 10 kHz. and higher. The DC supply is connected to supply substantially constant current to a controlled rectifier switching circuit. The controlled rectifiers are gated to produce alternating current in a commutating capacitor. The DC supply and switching circuit are connected to the load via a blocking capacitor so that the AC current component in the switching circuit appears as high frequency AC load current. The circuit arrangement imposes low operating stress levels on the controlled rectifiers, and provides a circuit turn-off time that is relatively independent of load.

4 Claims, 7 Drawing Figures

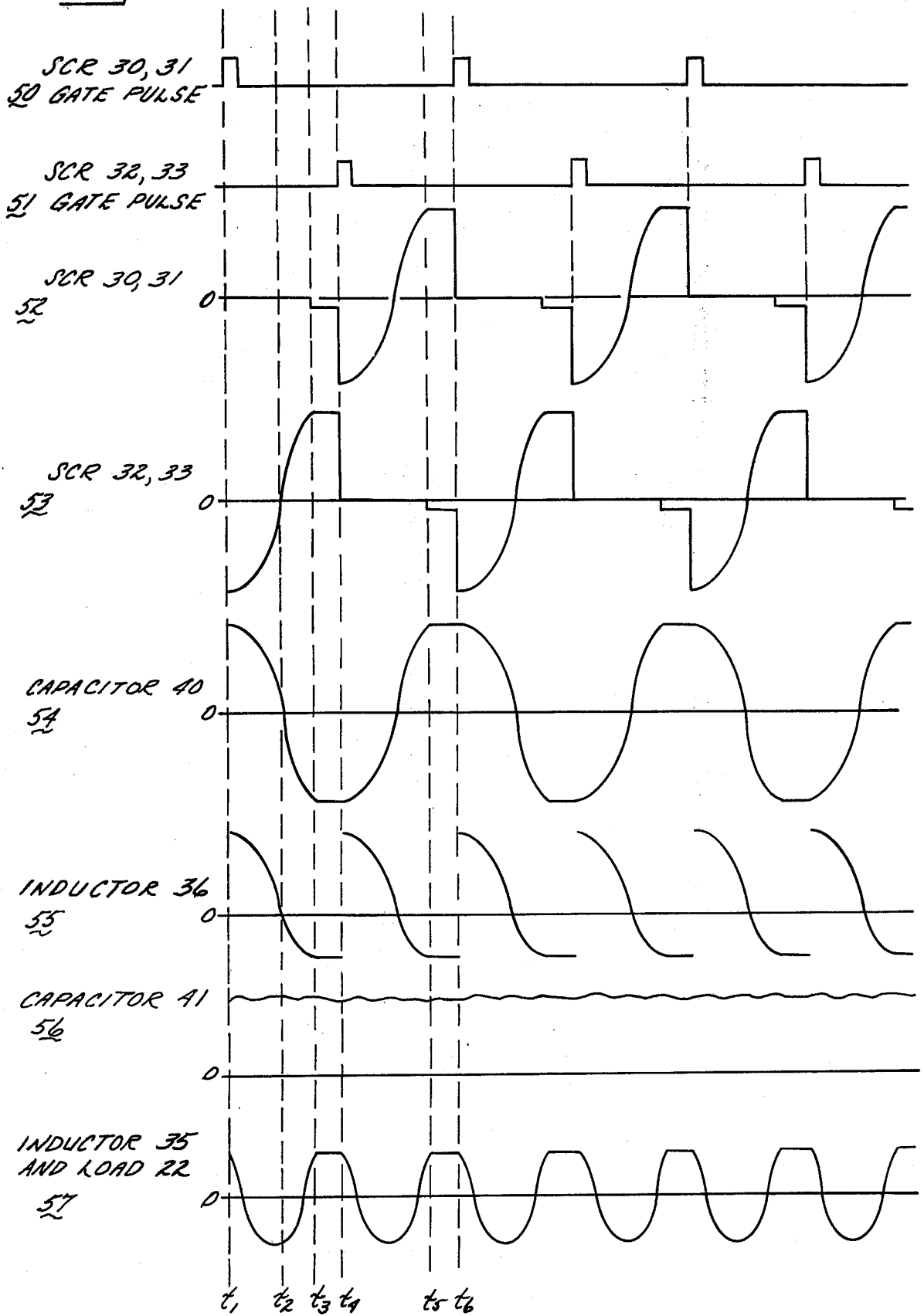

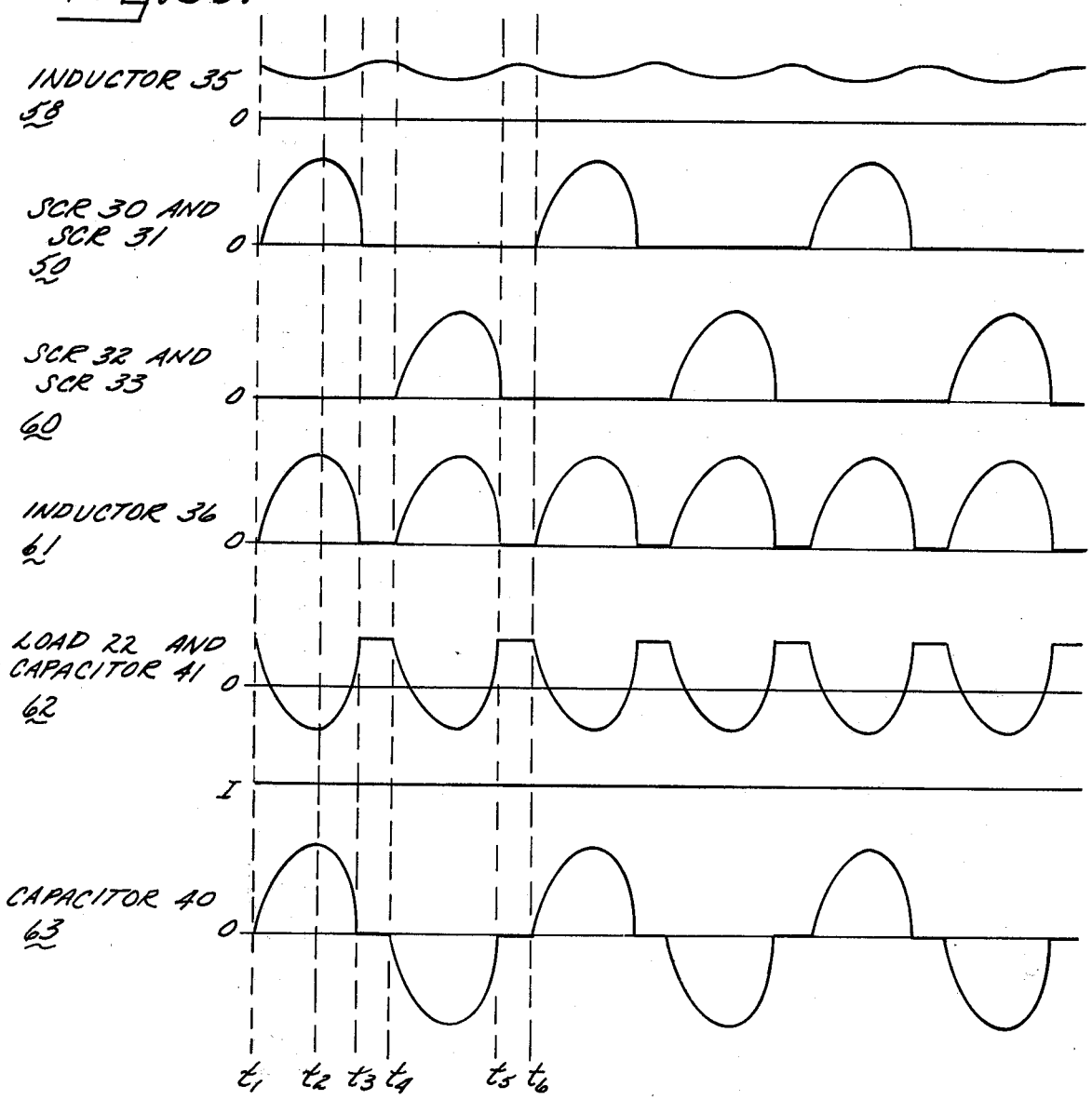

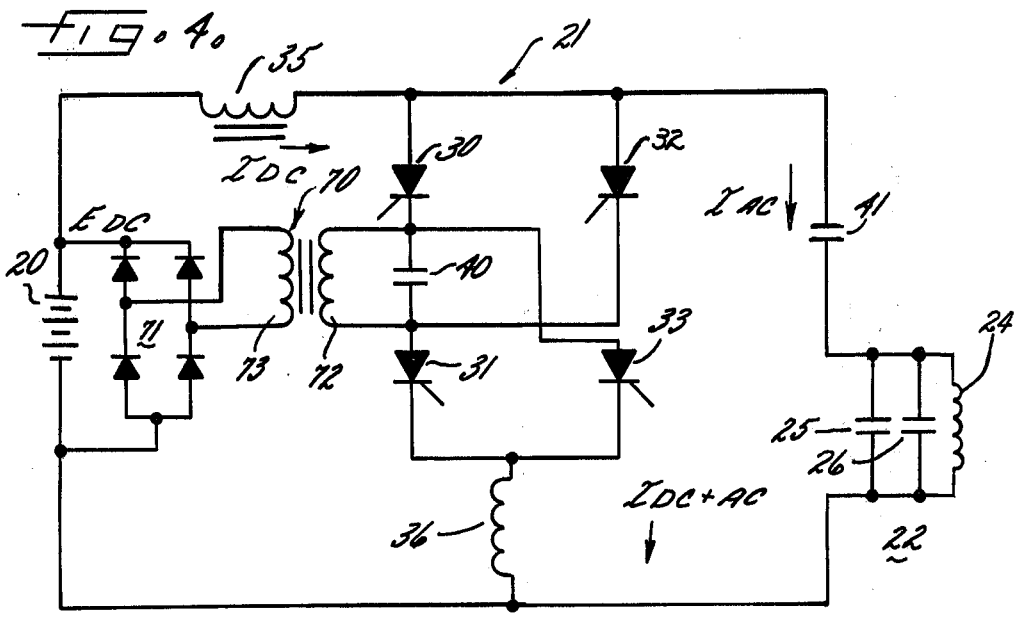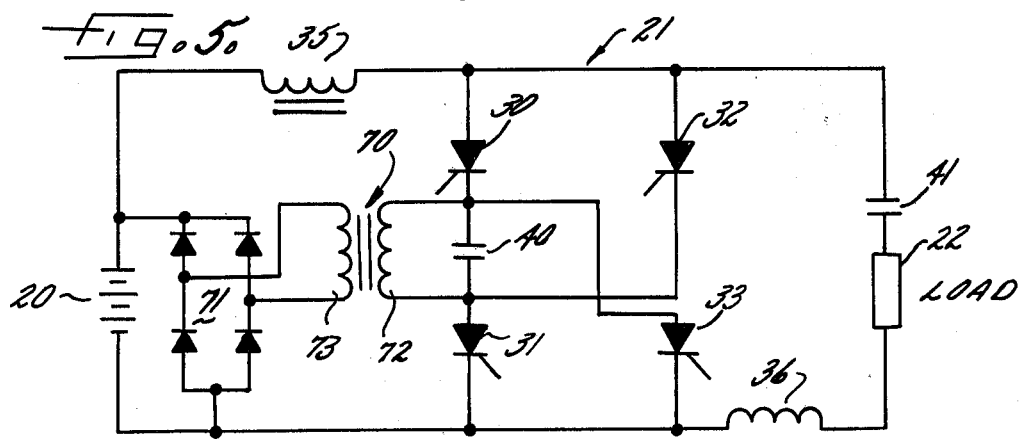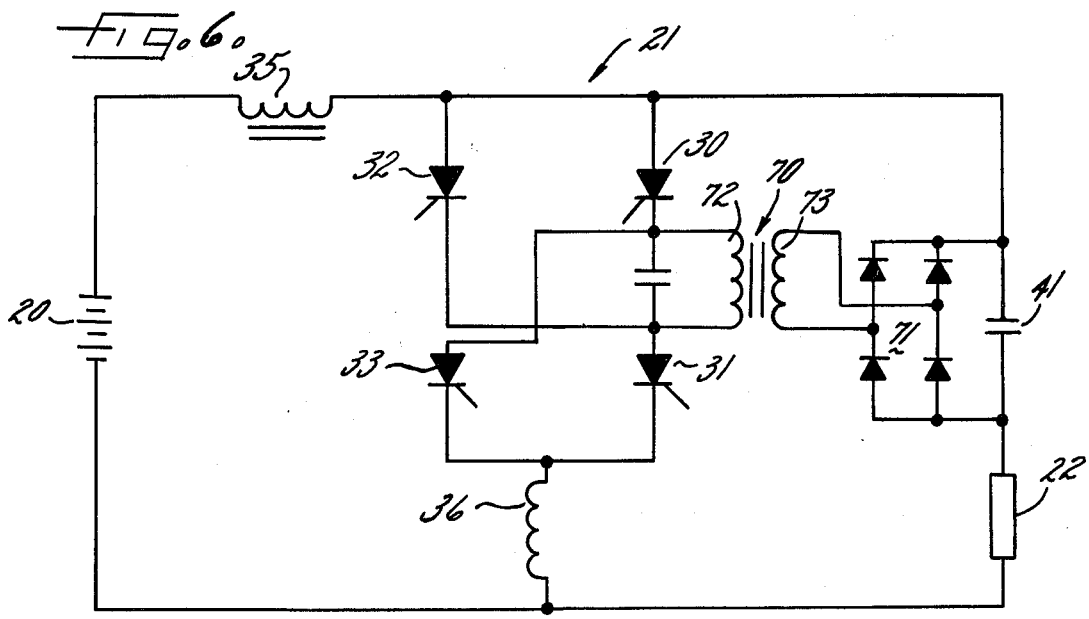

INDUCTION HEATING INVERTER

This invention relates to AC power supplies and more particularly to an improved static power converter for producing high frequency alternating current in a load. The invention is particularly, although not exclusively applicable to induction heating systems, for supplying and controlling power to induction heating loads.

Induction heating and various other industrial processes often require large amounts of alternating current power at substantially higher frequencies than available from commercial power lines. Originally, motor-generator systems were used to provide such power. More currently, various static power systems have been used, including some in which the power conversion has been accomplished under the control of silicon controlled rectifiers (SCR's).

In induction heating systems, because the energy is coupled to the workpiece via a magnetic field, the system load is characterized by a very low power factor. In practice, the power factor is usually corrected by means of capacitors connected in parallel across the induction heating coil. Since the required value of capacitance is found to vary widely with coil loading, provision is usually made, such as by using tap switches and capacitor banks, for adjusting the capacitance value. As an example, it is not unusual for a magnetic workpiece, when heated through its Curie temperature, to require an increase in power factor correction of 50%.

Motor-generator systems operate by nature with an invariable output frequency. In such systems load power factor can be corrected by simply switching additional capacitance across the coil during the heating cycle.

Static SCR power supplies, by way of contrast, operate with an easily adjustable output frequency. The output frequency is controlled in practice to continually correct the load power factor during a heating cycle. Thus, in static power systems, power factor correction can be accomplished without the need to adjust the power factor correcting capacitance value.

A further requirement in both types of induction power supplies, if maximum available output power is to be delivered to the workpiece, is that load impedance must be correctly matched with the power supply output characteristics. When a magnetic workpiece is heated through its Curie temperature, a change in load impedance occurs, resulting in power transfer less than optimal during some portion of the heating cycle. In motor generator systems, this disadvantage is somewhat offset by the change in load impedance that results when additional power factor capacitance is switched across the load during a heating cycle. The additional capacitance often acts favorably in compensating for the change in the load impedance, resulting in a more constant delivered power throughout the heating cycle.

Static power supplies, while capable of maintaining a high power factor via frequency adjustment, oftentimes can maintain relatively constant output power only with a significant increase in coil voltage. While theoretically possible to combine capacitor switching with variable output frequency control in order to maintain both constant power factor and constant power delivery, most static power supplies do not readily lend themselves to such techniques. More specifically, because of requirements for reliable SCR commutation, static power supplies do not in general possess the capability of operation with instantaneous changes in load characteristics. As a result, it is not possible to reliably switch power factor correcting capacitors with a static power supply while it is delivering power.

While static power supplies have achieved a large measure of success in induction heating applications, such supplies do exhibit certain disadvantages, particularly in the areas of SCR efficiency and reliability. Furthermore, as output frequency increases, efficiency and reliability becomes even greater problems. Among the efficiency problems are losses generated during turn-on of the SCR, and also reverse recovery losses occasioned while the SCR is turning off. Reliability considerations relate not only to maintaining a safe junction temperature in the face of the aforementioned losses, but also in assuring sufficient turn-off time for safe, reliable commutation. These considerations have constrained operation of prior art static power converters to output frequencies of 10 kHz. or less, and also, in many cases, have required the use of SCR's of higher capability operating under de-rated conditions.

Turn-on losses increase with increasing frequency because an increase in switching frequency is accompanied by an increase in the rate of rise of anode current. Not only is the amount of energy dissipated in the SCR junction increased for each current pulse, but the rate of application of the current pulses also increases, resulting in a rapid increase in total SCR conduction losses. In the prior art, SCR's have been operated at switching frequencies equal to the output frequency, or they have been operated at switching frequencies of one-third or one-fifth of the output frequency. In any of these cases, SCR conduction time has not been longer than one-half of a full output period. For example, assuming an output frequency of 10 kHz., the maximum conduction time would be not greater than 50 microseconds.

With respect to the turn-off time factor, after a controlled rectifier has been in conduction, it requires application of reverse voltage for a length of time sufficient to cause it to regain its forward voltage blocking capability. That time interval, known as SCR turn-off time, is dependent largely on the SCR characteristics, but somewhat on the circuit operating parameters, specifically the magnitude of applied reverse voltage and the rate of increase of reapplied forward voltage, known as reapplied dv/dt. To ensure reliable SCR commutation, the applied circuit turn-off time in the particular circuit configuration must be longer than the rated SCR turn-off time for the devices used.

In prior art inverter circuits, the circuit turn-off time typically achieved is no more than about 25% of the output period, which would be 25 microseconds or less at an output frequency of 10 kHz. This requires the use of either fast turn-off SCR's, or a circuit configuration where the turn-off time is safely in excess of the SCR ratings.

Also in prior art inverter circuits, the amount of circuit turn-off time is generally affected by conditions in the load. For example, the circuit turn-off time may decrease when the applied load increases, or the circuit turn-off time may depend on load power factor. These factors have generally necessitated the use of control circuits to monitor SCR operation in order to trip the system if circuit turn-off time becomes dangerously short.

Finally with respect to reverse recovery losses, such losses are caused by the simultaneous application of reverse voltage and reverse recovery current. Reverse recovery current is that which flows through the SCR in the opposite direction to forward current, immediately upon cessation of forward current flow. The magnitude and duration of reverse recovery current depends partly on the SCR characteristics and partly on circuit operating conditions. Recovery current is found to increase as the rate of decay of forward current increases, resulting in an increase in the amount of energy dissipated during recovery as the duration of forward current pulses becomes shorter. An increase in SCR switching frequency is accompanied by a rapid increase in junction losses due to recovery, because of the combined effect of greater loss during each recovery cycle and higher frequency of recovery.

Prior art inverter circuits have attacked the problem of SCR recovery losses in various ways. Oftentimes, in order to maintain reliable operation, the controlled rectifiers are operated with sufficient forward current de-rating so that even in the presence of high recovery losses, the total junction losses are maintained within device ratings. In other cases, anti-paralleled diodes are connected across the SCR in order to limit the magnitude of reverse recovery voltage and therefore the SCR junction loss during recovery. A disadvantage of this latter approach is a potential increase in required SCR turn-off time. In addition, a component of the SCR forward current is returned to the power source through the diode in order for turn-off to occur. In other words, a portion of the average SCR forward current does not contribute to useful power output, but is returned to the power source, resulting in less efficient utilization of the SCR switching capabilities, and circuit operation at less than optimum efficiency of energy conversion.

With all of the foregoing in mind, it is a general aim of the present invention to provide a static power supply which is highly load-insensitive, and which operates at efficiencies greater than those achieved heretofore.

More specifically, it is an object of the invention to provide a static power converter with a high degree of immunity from conditions in the load circuit, such that reliable operation is maintained under all possible load conditions. Further in that regard, it is an ancillary object to provide such a power converter capable of operating without damage even under conditions of short circuit in the load. A resulting object according to this feature of the invention is to allow switching of power factor correcting capacitance when desired in order to maintain optimum operation.

A general object of the invention is to provide a power converter characterized by low stress levels on the switching elements, and capable of high efficiency operation.

Referring specifically to turn-on losses which are characteristic of static power supplies, a detailed object of the invention is to provide a static power supply wherein the conduction time of the controlled rectifiers is substantially greater than 50% of the output period.

According to the circuit turn-off time aspect of the present invention, it is an object to provide a power converter circuit wherein allowed turn-off time is greater than 50% of the output period. Furthermore, it is an object to make such turn-off time relatively independent of the impedance and power factor of the load.

With respect to the reverse recovery loss aspects of the present invention, it is an object to provide a static power converter which minimizes reverse recovery losses by applying reverse recovery commutation voltage only after the reverse recovery current has ceased.

Other objects and advantages will become apparent from the following detailed description when taken in conjunction with the drawings in which:

FIGS. 3a and 3b are diagrams illustrating voltage and current waveforms in the circuit of FIG. 2;

FIG. 4 is a schematic diagram showing a power converter presently considered to be the preferred embodiment of the invention; and FIGS. 5 and 6 are schematic diagrams showing alternative embodiments of the invention.

While the invention will be described in connection with certain preferred embodiments, there is no intent to limit the invention to those embodiments. On the contrary, the intent is to cover all alternatives, modifications and equivalents included within the spirit and scope of the invention as defined by the appended claims.

Figure 1:
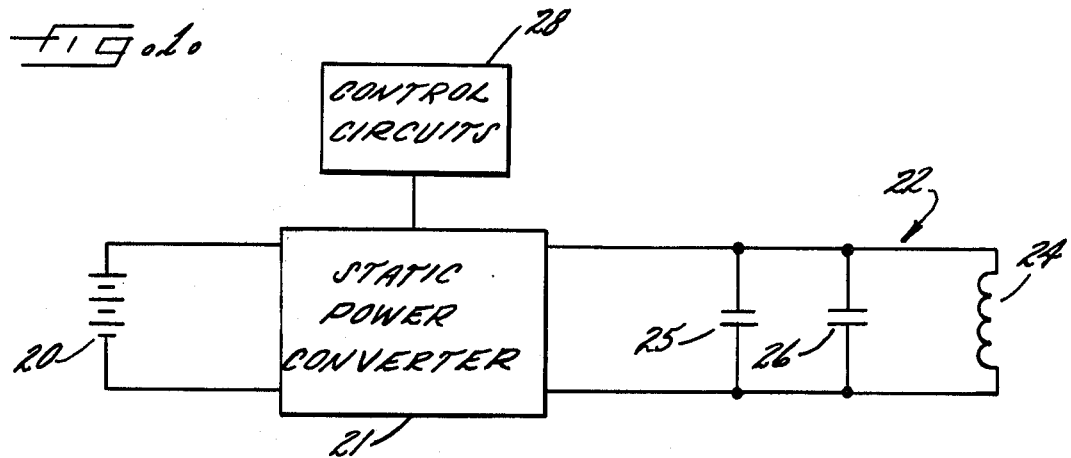
FIG. 1 is simplified block diagram illustrating the elements of a static power converter.

Turning now to the drawings, FIG. 1 shows in block diagram form the elements of an induction heating power supply. A DC source is illustrated as battery 20; in the typical installation the DC source will be configured as a rectifier arrangement driven from a commercial AC power line. A further alternative in the case where a variable DC supply is desired, is a phase controlled bridge. A static power converter 21 converts DC power from the source 20 to high frequency AC power for application to a load generally indicated at 22. The load comprises an induction heating coil 24 magnetically coupled to a workpiece (not shown) for delivering high frequency energy thereto. Power factor correcting capacitors 25, 26 form a parallel resonant tank with the coil 24 and load, having a natural frequency nearly equal to the output frequency of the power converter. The two power factor correcting capacitors 25, 26 are intended to illustrate that one or more of such capacitors can be switched into circuit in order to adjust the power factor of the coil 24 and coupled load. A control circuit module 28 is provided to monitor and control the operation of the power converter 21. Among the functions of the control circuit module 28 is the application of gate drive pulses of the proper frequency to the controlled rectifiers within the static power converter 21.

Figure 2:
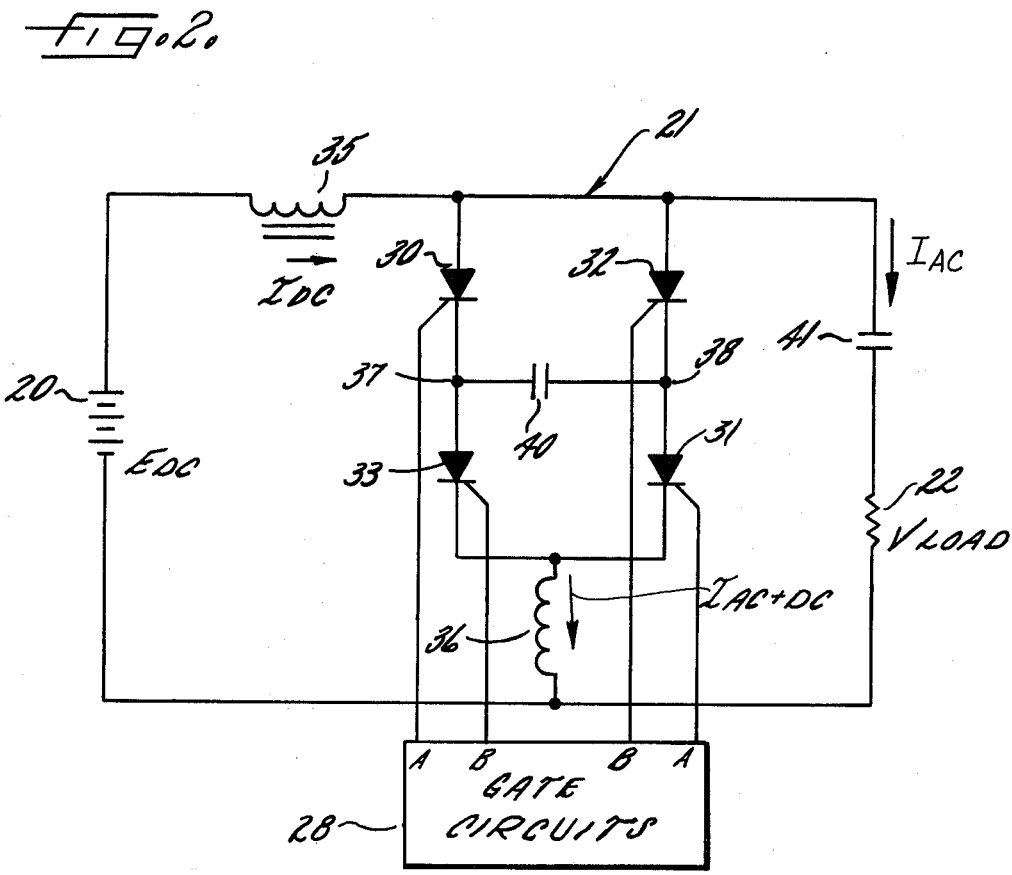
FIG. 2 is a schematic diagram illustrating a power converter according to the present invention.

FIG. 2 shows the power converter in greater detail, including a plurality of controlled rectifiers 30–33 arranged in a full-wave bridge configuration. The DC power source comprises the battery 20 connected to the input of the bridge 21 via a smoothing inductor 35. The smoothing inductor 35, or DC choke as it is sometimes known, has sufficient inductance to supply substantially constant current during steady state operation. The negative terminal of the battery is connected to the other input of the bridge 21 via a pulse shaping inductor 36. Across the bridge terminals 37, 38, normally considered the bridge output, is connected a commutating capacitor 40. The DC source, in addition to the bridge connections just described, is also connected to the load 22 via a DC blocking capacitor 41. The capacitor 41 has sufficient capacitance to maintain substantially a constant DC voltage during steady state operation. As such, the capacitor appears to the high frequency circuit as a DC voltage source.

As will be described below, the SCR's in the bridge are gated in pairs, the pair 30, 31 being gated in sequence with the pair 32, 33. When a pair of SCR's is conducting, an underdamped series resonant circuit is formed by the commutating capacitor 40, pulse shaping inductor 36 and the load 22. As noted above, during this condition the blocking capacitor 41 appears as a DC voltage source. The natural frequency of this series resonant circuit is established to be about 65% of the output frequency. For example, if the output frequency is set at 10 kHz., the natural frequency of the series resonant circuit is established at about 6.5 kHz. It should be noted at this point that the 10 kHz. operating frequency of the illustrated embodiment is not to be taken in a limiting sense. Utilizing commercially available components, the circuit will operate reliably to at least 25 kHz., and possibly higher as component characteristics improve. In the case of the pure resistive load illustrated in FIG. 2, the natural frequency is established by the values of commutating capacitor 40 and pulse shaping inductor 36. With that period established at about 65% of the output frequency, and with gating of each pair of legs causing a full cycle of the output frequency as will be described below, the conduction interval of each pair of SCR's is about 75 to 80% of a full output period. That fact will be better illustrated with reference to the waveforms of FIGS. 3a and 3b.

Traces 50 and 51 of FIG. 3a shows the gate pulses applied to the pairs of SCR's in the full-wave bridge. The trace 50 shows the gate pulses applied to the SCR's 30, 31 (identified by the symbol A in the gate circuit 28 of FIG. 2), whereas the trace 51 shows the gate pulses applied to the SCR's 32, 33 (identified by the letter B). Assuming the system is to operate at an output frequency of 10 kHz., the time interval between the leading edge of a pulse 50 and the leading edge of the subsequent pulse 51 would be 100 microseconds. Accordingly, each leg of the bridge is operated at one-half the output frequency, or at an interval of 200 microseconds.

At the time $t_1$, the gate pulse shown in trace 50 causes the SCR's 30, 31 to switch into conduction, so that the voltage thereacross becomes very small as shown in trace 52. The voltage present on the commutating capacitor 40 from the previous cycle (trace 54) is applied to the SCR's 30, 33 as reverse voltage as shown in trace 53. The SCR's 30, 31 begin to conduct a half sinusoidal current pulse as shown in trace 59. Capacitor 40 and inductor 36 resonate, the voltages thereacross passing through zero at time $t_2$ (as shown in traces 54, 55), the point at which the current pulse is at a maximum as shown in trace 59. The circuit resonates, with current flow decreasing and voltage building up in the reverse direction as shown in traces 59, 54 and 55. At the point $t_3$, voltage across the capacitor is at a maximum in the reverse direction (trace 54) and voltage across the inductor is also at a maximum and in the reverse direction (trace 55), whereas current flow has fallen to zero (trace 59). Since current flow cannot reverse through the SCR's, the SCR's 30, 31 commutate beginning at time $t_3$. As shown in trace 52, the reverse commutation voltage initially applied (between time $t_3$ and $t_4$) is relatively small in magnitude, which limits reverse recovery losses. At the point $t_4$, the gate pulse shown in trace 51 causes the opposite leg of the bridge to conduct by triggering SCR's 32, 33. Trace 52 shows the voltage across the capacitor 40 being imposed across the now non-conducting SCR's 30, 31 as reverse commutation voltage. While the SCR's 32, 33 conduct as shown in trace 53, the resonant current pulses cause a relatively low rate of reapplied dv/dt to the non-conducting SCR's 30, 31 as illustrated between the points $t_4$ and $t_5$ of trace 52. In the manner just described, the circuit resonates and self commutates at the point $t_5$, causing a relatively small reverse recovery voltage to be applied across the SCR's 32, 33 between the points $t_5$ and $t_6$, following which the first leg is again gated. Operation continues with the legs being alternately gated to cause resonant current pulses through the bridge and in the load.

Trace 61 shows that the current pulses through the inductor 36 comprises the sum of the current pulses through the respective legs illustrated in traces 59 and 60. Current pulses through the commutating capacitor 40 are alternately positive and negative as shown in traces 63. But because of the combination of those pulses in the inductor 36, and by virtue of the DC blocking capacitor 41 and the DC choke 35, bi-directional current pulses flow in the load as illustrated in trace 62. As shown in the drawings those current pulses are nearly sinusoidal, and have a repetition rate determined by the triggering rate of the pairs of SCR's 30, 31 and 32, 33. Thus, triggering of each leg causes a full cycle in the output circuit, allowing the respective legs to be triggered at only one-half the output frequency. Furthermore, it is seen by a comparison of the conductive interval (for example between $t_1$ and $t_2$) and the period of the output wave (between $t_1$ and $t_3$), that each leg is conductive for about 80% of the output period. Also considering trace 52, it is seen that the period between the initiation of commutation identified as $t_2$, and the point at which the voltage across the non-conducting SCR's swings positive, (which is the period available for commutation), that an interval equal to about 60% of the output period is available for commutation. As a result of the extended conduction interval, turn-on losses in the SCR's are minimized; as a result of the extended period available for commutation, reliable commutation is assured. Furthermore, because of the longer conduction time and consequent reduction in recovered charge along with the relatively low value of commutation voltage initially applied, reverse recovery losses are held to a minimum.

It is believed worthwhile at this point to consider the broader aspects of the illustrated inverter circuit and the advantages attendant thereto. In conventional practice the load would be connected in some fashion between the bridge output terminals 37, 38. As a result, conditions in the load circuit will have a very major effect on operation of the controlled rectifiers. By way of contrast, in the inverter according to the invention, a pure capacitance is connected across the output of the bridge, and the load itself is connected external to the bridge. The DC supply by virtue of the choke 35 delivers a substantially constant current. The switching circuit connected to receive the constant current introduces a non-linearity (the switching of the controlled rectifiers) which produces an AC current component. The load is connected via a DC blocking capacitor to the switching circuit and to the supply so that the AC current component flows in the load and becomes the load current. When the switching circuit is conducting a series resonant circuit is established which is underdamped for all load conditions. The time constant of the switching circuit is substantially independent of the load and controlled by the values of the commutating capacitor 40 and the pulse shaping inductor 36. While the reactants of the load 22 may have some effect on the time constant, such effect is minor. As noted, the series resonant circuit is underdamped such that assurance is provided that the voltage on the commutating capacitor will reverse. Accordingly, when a pair of SCR's in the bridge is gated, that reverse voltage will appear across the previously conducting SCR's to assure commutation. Because no condition in the load is capable of affecting the purely capacitive load at the output of the bridge, commutation is assured for all load conditions. Furthermore, with the circuit operating according to the relationships described above, a period of time is assured when only the total loop voltage is imposed across an SCR pair for commutation before the opposite pair is gated to impose the full commutation capacitor voltage as reverse recovery voltage.

While the circuit of FIG. 2 operates satisfactorily with an appropriate value of load resistance, complications can arise when a reactive load is applied to the output. More specifically, if the energy drawn from the DC source 20 is not dissipated in the load 22, the voltage levels on the commutating capacitor 40 can increase for each cycle without bound. To prevent such an occurrence, and also to maintain conduction levels, commutation intervals, and the like near those shown in FIGS. 3a and 3b, means are provided for limiting voltage buildup on the capacitor 40, and thus the energy stored in the inverter prior to initiation of a conductive cycle.

FIG. 4 shows the embodiment of the invention presently considered to be preferred, including such clamp means for allowing operation into reactive loads. As in the case of FIG. 2, the power converter 21 includes a full-wave bridge comprising SCR's 30-33, operating through a pulse shaping inductor 36 into a load 22. Also as in the case of FIG. 2, the DC source 20 is coupled to the converter via a smoothing inductor 35, and via a DC blocking capacitor 41 to the load 22. However, the load 22 in the instant case comprises an induction heating coil 24 and parallel connected power factor correcting capacitors 25, 26. As noted in the introductory portion, the capacitors can be switched if desired, along with appropriate adjustment of the gating frequency to match the power factor of the load with the operating frequency of the circuit and also to achieve maximum power transfer. The circuit of FIG. 4 also has a gating circuit for the SCR's in the full-wave bridge as shown in FIG. 2; in the interest of clarity, such module is not shown in FIG. 4 and subsequent figures.

In order to limit the maximum voltage which can be built up on the commutating capacitor 40, clamp means are provided, shown herein as a high frequency transformer 70 operating in conjunction with a full-wave diode bridge 71. The transformer 70 has a primary 72 connected directly across the commutating capacitor 40. The secondary 73 of the transformer is connected to the input terminals of the bridge 71. In the FIG. 4 embodiment, the output terminals of the bridge are connected across the battery 20. Accordingly, when the voltage across the commutating capacitor 40 reaches a value which causes the voltage at the output terminals of the bridge 71 to exceed the battery voltage, the bridge will return current to the battery 20. As a result, the voltage on the capacitor 40 will be clamped at that level, and the excess energy will be returned to the power source. The circuit of FIG. 4 establishes a limit for voltage on the commutating capacitor 40 which is equal in magnitude to the turns ratio of the transformer 70 multiplied by the voltage level of the battery 20.

With the circuit illustrated in FIG. 4, in the condition when the load 22 is not withdrawing all of the power provided by the DC source, a portion of the current flowing in the DC choke 35 will be provided by the rectifier bridge 71 instead of the battery 20. In the extreme case, when the load 22 will not absorb any power (such as in the case of a short circuit across the load or a pure reactive load), the current drawn from the battery 20 will be very small, just sufficient to supply circuit losses. In this situation, the average current from the bridge 71 will be nearly equal to the average value of the current through the controlled rectifiers 30-33.

In the opposite extreme, when the load characteristics are such that the load will absorb all the power supplied by the converter, all of the current through the DC choke 35 will be supplied by the battery 20. In this situation, there will be little or no current flow in the diode bridge 71, and substantially none of the average current flowing through the controlled rectifiers 30-33 will be returned to the battery 20.

It is worthwhile to note that when the system is designed for maximum efficiency of energy conversion, the allowable maximum voltage on the commutating capacitor 40 is established as the operating voltage at which the load is withdrawing maximum power from the converter. The turns ratio of the transformer is established so that the clamping elements do not come into play so long as the load is withdrawing maximum power. It is only when the load is mismatched or not withdrawing maximum power that the voltage on the commutating capacitor 40 will exceed the aforementioned maximum level and the clamp circuit will come into play. As a result, with the system optimized in this way, when operating at maximum power, energy conversion efficiency is at a maximum; when the load is not capable of withdrawing maximum power, it is only then that the clamp circuit returns excess energy to the battery.

It will be appreciated that since the clamp means limits the maximum voltage excursions of the commutating capacitor 40 to a predetermined level, the time relationships described in connection with FIGS. 3a and 3b will substantially apply to the circuit of FIG. 4, independently of the load applied to the system. Even with the power converter operating into a short circuited output, the conduction intervals, the proportion of the output period available for turn-off, and the relatively small initially applied commutation voltage will remain substantially as described in connection with FIGS. 3a and 3b. As a result, the illustrated power converter has triggering and turn-off characteristics in the power converter which are substantially independent of load. The controlled rectifiers 30-33 arranged in a full-wave bridge with capacitive output, while controlling current flow in the load, remain relatively isolated from the load insofar as SCR commutation is concerned. As a result, it is even possible to switch values of power factor correcting capacitors 25, 26, without danger of creating commutation failure in the converter bridge.

The power converter of FIG. 4 can achieve output voltage control by varying the frequency of the triggering pulses applied to the respective legs of the controlled rectifier bridge. In addition, where desired, because the bridge circuit itself is relatively insensitive to the applied load, power factor correcting capacitance can be switched. The load in the FIG. 4 embodiment consists of the heating coil 24 (and applied load) and the parallel connected power factor correcting capacitances 25, 26. These elements form a parallel resonant tank circuit, the impedance of which increases as output frequency increases up to the resonant frequency, and then decreases at frequencies beyond resonance. The power converter appears to the load as a variable frequency source of AC current. The power converter is easily configured with a range of output frequency variable between about 60 and 100% of maximum frequency. With a typical induction load, this frequency variation effects a load voltage variation of approximately 25 to 100% of full voltage, or equivalently a range of about 7 to 100% of output power control.

FIG. 5 illustrates an alternative embodiment of the invention wherein the negative terminal of the battery is connected to the junction between the cathodes of SCR's 31, 33 and pulse shaping inductor 36. The remaining circuit connections remain the same. Circuit operation is substantially the same as described in connection with FIG. 4 with certain exceptions now to be described. The RMS current through the pulse shaping inductor 36 is approximately 30% less than in the circuit of FIG. 4, because in the modified circuit, there is no DC component of current in the coil. However, the voltage across the DC choke 35 is approximately 40% higher than in the circuit of FIG. 4 because the pulse coil 36 in the modified circuit is in series with the load.

FIG. 6 illustrates a further alternative embodiment of the invention, similar to the embodiment of FIG. 4, but differing in that the output terminals of the diode bridge 71, rather than being connected to the battery 20, are connected to the DC blocking capacitor 41. Circuit operation is similar to the embodiment of FIG. 4, except that excess energy from the commutating capacitor is returned to the DC blocking capacitor 41. In this situation, the portion of the average value of SCR current that does not contribute to useful power output, rather than being returned to the source, is used to produce a DC component of current flow in the load 22. In this case, it is important that the load 22 have characteristics which are not impaired by direct current flow.

It will now be apparent that what has been provided is an improved inverter circuit, particularly suitable to induction heating applications, wherein conditions within the inverter are substantially independent of the load applied to the induction heating coil. The full wave SCR bridge produces variable frequency AC output current in the load, while operating conditions within the inverter circuit itself are maintained relatively independent of load.

I claim as my invention:

1. A power converter for converting DC power from a source to AC power in a load comprising in combination, a plurality of controlled rectifiers connected in a full-wave bridge, a commutating capacitor connected across the output of said bridge, smoothing inductance means connecting the DC source to the input of said bridge, resonating inductance means connecting the bridge to the load, blocking capacitor means connecting the DC power source and bridge to the load, means gating opposite legs of said bridge sequentially to cause bidirectional current in said load; and clamp means including a transformer having a primary winding connected across the commutating capacitor, a secondary winding and diode means connected to the secondary winding for returning power to the source.

2. The power converter as set forth in claim 1 wherein the resonant frequency is about 65% of the output frequency.

3. A power converter for converting DC power from a source to AC power in a load comprising in combination, a plurality of controlled rectifiers connected in a full-wave bridge, a commutating capacitor connected across said bridge, means connecting said bridge to said load, means for delivering a substantially constant current from the DC power source to said bridge, DC blocking means connecting said load to said bridge and said DC power source, means gating opposite pairs of the controlled rectifiers for causing AC current flow through the commutating capacitor and said load, said commutating capacitor being the only element connected in said bridge, thereby to assure commutation of the controlled rectifiers; and clamp means including a transformer having a primary winding connected across the commutating capacitor, a secondary winding and diode means connected to the secondary winding for returning power to the source.

4. The power converter as set forth in claims 1 or 3 wherein the turns ratio of the transformer is constructed to establish a maximum voltage level for the commutating capacitor at approximately the voltage level existent across the commutating capacitor when the power converter is delivering rated load, whereby the clamp means does not reduce efficiency at rated load.

* * * * *

UNITED STATES PATENT AND TRADEMARK OFFICE
CERTIFICATE OF CORRECTION

PATENT NO. : 4,275,438

DATED : June 23, 1981

INVENTOR(S) : Robert P. Stirniman

It is certified that error appears in the above-identified patent and that said Letters Patent is hereby corrected as shown below:

Col. 5, line 45, cancel "30" and insert --32--.

Signed and Sealed this

Thirteenth Day of October 1981

[SEAL]

Attest:

GERALD J. MOSSINGHOFF

Attesting Officer     Commissioner of Patents and Trademarks